United States Patent [19]

Falek

[11] Patent Number: 5,117,352

[45] Date of Patent: May 26, 1992

[54] MECHANISM FOR FAIL-OVER NOTIFICATION

[75] Inventor: Louis H. Falek, Belmont, Mass.

[73] Assignee: Digital Equipment Corporation, Maynard, Mass.

[21] Appl. No.: 424,903

[22] Filed: Oct. 20, 1989

[51] Int. Cl.⁵ .................. G06F 11/20; G06F 15/16
[52] U.S. Cl. .................. 395/575; 364/228.3; 364/230.3; 364/268.9; 364/DIG. 1; 371/11.3
[58] Field of Search .......... 364/228.3, 230.3, 268.1, 364/268.9, 270.7; 371/9.1, 11.3, 16.1, 16.5

[56] References Cited

U.S. PATENT DOCUMENTS

| | | | |
|---|---|---|---|
| 4,399,504 | 8/1983 | Obermarck et al. | 364/200 |
| 4,480,304 | 10/1984 | Carr et al. | 364/200 |
| 4,646,298 | 2/1987 | Laws et al. | 371/16.1 |
| 4,660,201 | 5/1987 | Nakamura | 371/11.3 |
| 4,665,520 | 5/1987 | Strom et al. | 364/200 |
| 4,768,150 | 8/1988 | Chang et al. | 364/200 |
| 4,803,683 | 2/1989 | Mori et al. | 371/19 |
| 4,815,076 | 3/1989 | Denny et al. | 371/11.1 |
| 4,827,411 | 5/1989 | Arrowood et al. | 364/200 |
| 4,965,719 | 10/1990 | Shoens et al. | 364/200 |

*Primary Examiner*—Charles E. Atkinson
*Attorney, Agent, or Firm*—Kenyon & Kenyon

[57] ABSTRACT

An automatic failure notification mechanism for use in a computer network wherein several co-operating parts of an application program are each running on a different node of the computer network. The mechanism comprises a set of linked subroutines called by each part of the application program and operating through the use of a distributed lock manager to designate one part as a part to receive failure notification and to link and reverse link the selected part and the other parts of the application program. The failure notification mechanism utilizes the link and reverse link to initiate a failure communication upon the failure of a node executing one part of the application program.

57 Claims, 7 Drawing Sheets

MECHANISM FOR FAIL-OVER NOTIFICATION

FIELD OF THE INVENTION

The invention relates to failure notification in a computer network wherein several co-operating parts of an application program are each running on a different node of the computer network.

BACKGROUND OF THE INVENTION

In modern computer data processing, improved efficiency in the execution of an application program is often achieved by separating the program into several cooperating parts and running each part on a different CPU within a computer network. The several parts of the application program are each run as a detached process on a specific CPU. The several parts may be active one at a time with the other inactive parts in a "standby" mode or they can all be active at the same time as cooperating parts of the overall data processing operation.

For reliable execution of the entire application program, each CPU running one of the parts of the application must function properly throughout the entire processing of the part. If one part of the application program fails due to a CPU crash, it is imperative that notification of the failure be made to enable a network manager to implement appropriate corrective actions. For example, the network manager can transfer the failed part of the application program to another CPU on the network for execution.

The monitoring of proper network operation is an important yet time consuming function typically carried out by network managers and operators. Upon a CPU crash, the network manager must ascertain if the CPU was executing a co-operating part of an application program, identify the application program and the part running on the failed CPU and then take appropriate steps to restart the application program. Accordingly, there is a need for an automatic, reliable mechanism to detect a failure among network components running co-operating parts of an application program and to provide efficient, informative notification of the failure.

SUMMARY OF THE INVENTION

The present invention provides an automatic fail-over notification mechanism that is largely transparent to application developers and easily implemented by inserting a call subroutine instruction in each part of an application program. The mechanism comprises a set of linked subroutines called by each part of the application program and operating through the use of a distributed lock manager to link and reverse link the various parts of the distributed application program. The fail-over notification mechanism utilizes the links and reverse links to initiate a failure communication upon the crash of a CPU executing one part of the application program. The failure communication contains information that is sufficient to initiate an automatic recovery from the failure without the need of manual intervention by a network operator or manager.

A distributed lock manager, as for example the VMS Distributed Lock Manager marketed by DIGITAL EQUIPMENT CORPORATION, is a mechanism for coordinating network wide access to files and their individual records and to synchronize interprocess events across the entire network. Generally, the lock mechanism permits a program developer to name each resource on the network, whether physical or logical, and to require an application program running on a CPU (i.e. a process) to request a lock for that resource prior to acess to the named resource. For example, a database or a subset thereof can be a resource and a lock can be in one of several lock modes recognized by the lock manager. Lock modes can include various exclusive or shared write and read access privileges to the resource to share access with other processes or prevent access by other processes.

The lock manager also maintains granted and waiting queues for lock requests for each named resource and services waiting requests in a first come, first served manner. A lock request is placed in a granted queue when the request is granted and is placed in a waiting queue when the lock request is incompatible with an already granted lock request. Each process running in a network can enqueue and dequeue (release) lock requests from a lock request queue and, further, specify an asynchronous system trap in the lock request.

An asynchronous system trap is a routine that interrupts a running process upon the occurrence of an event and then executes. In the lock mechanism, the events can include the granting of a lock request or the making of a lock request that is incompatible with an already granted lock request. When an asynchronous system trap is invoked by the granting of a lock request it is referred to as a completion AST. When an asynchronous system trap is invoked by the making of a lock request that is incompatible with an already granted lock request it is referred to as a blocking AST. A process that specifies an AST with its lock request will be interrupted by the routine relating to the specified AS when the lock request is granted in the case of a completion AST or when another process makes a request for a lock mode that is incompatible with the lock mode granted to the process in the case of a blocking AST.

In addition, a lock manager can include a communication facility which may comprise a lock value block associated with the lock queues for the resource name. A lock value block may contain, e.g., 16 bytes of information which can be input and/or read by a process through the enqueuing and dequeuing of lock requests. The information can comprise interprocess messages.

The present invention provides a fail-over notification mechanism by naming certain logical resources relating to processes that constitute the parts of a distributed application program and requiring a certain set of ordered compatible and incompatible lock requests for those resources to link and reverse link the processes through the lock request queues. The present invention also specifies completion and blocking asynchronous system traps in the lock requests to cause the issuance of reverse linking lock requests and provide failure notification upon the crash of a CPU running one of the parts of the application program.

The logical resources include a "SPECIAL" resource, a "BROADCAST" resource, a "PERMISSION_TO_TALK" resource, and a resource uniquely named for each one of the parts of the application program. The SPECIAL resource is the process selected to receive failure notification whenever one of the other parts of the application fails and to take corrective action. The BROADCAST resource utilizes the communication facility of the lock manager to advise the SPECIAL resource when a part of the application program has entered or leaves the network. The PERMIS- SION_TO_TALK resource operates in conjunction with the BROADCAST resource to assure transmission of messages between processes. Finally, each process executing a portion of the application program names a resource that uniquely identifies the part, e.g., the resource name can be based upon the nodename where the process is located within the network.

The fail-over mechanism is activated by a single subroutine call instruction that is inserted in each part of an application program by a program developer. The subroutine call instruction calls a SETUP routine. The SETUP routine makes all of the lock requests and associated asynchronous system traps calls necessary to setup the fail-over mechanism. The use of the SETUP routine, which is resident in the network and available to all application programs, makes the fail-over mechanism transparent to the application developer. The SETUP routine makes three lock requests on behalf of the process which called it, as follows:

1. A request for a lock on the BROADCAST resource in a CONCURRENT READ lock mode (the SETUP routine will wait for the granting of this lock request);

2. A request for a lock on the resource named after the the specific part of the application program, called herein a SERVER_xxx resource (wherein x uniquely identifies the part of the application program constituting the calling process) in a PROTECTED WRITE lock mode (The SETUP routine will wait for the granting of this lock request); and 3. A request for a lock on the SPECIAL resource in an EXCLUSIVE lock mode;

The lock request for the SPECIAL resource in EXCLUSIVE specifies a completion AST called SPECIAL_AST. since the request is for an EXCLUSIVE lock mode, only one of the processes of the application program, usually the first to make the request, will be granted the lock request. The other processes of the application program will have their respective lock requests placed in a LOCK REQUEST FOR SPECIAL IN EXCLUSIVE MODE WAITING queue. The process granted the EXCLUSIVE mode request is then interrupted by the SPECIAL_AST completion routine which makes that process assume responsibility for receiving and acting upon a failure notification (the process granted the EXCLUSIVE lock is referred to as the special server).

More specifically, the SPECIAL_AST utilizes the lock manager to obtain a list of all of the processes in the LOCK REQUEST FOR SPECIAL IN EXCLUSIVE WAITING queue. As should be understood, the list derived from the LOCK REQUEST FOR SPECIAL IN EXCLUSIVE WAITING queue corresponds to all of the other processes of the application program. Thus, the list provides a forward link between the process assigned responsibility for receiving failure notification and the other processes of the application program through the LOCK REQUEST FOR SPECIAL IN EXCLUSIVE WAITING queue.

The SPECIAL_AST will then issue a lock request in EXCLUSIVE for each of the SERVER_xxx resources corresponding to the processes in the waiting queue list. Since the lock request in EXCLUSIVE is incompatible with the PROTECTED WRITE locks granted to the listed processes corresponding to the SERVER_xxx resources, each of the lock requests made by the SPECIAL_AST on behalf of the special server will be placed in respective LOCK REQUEST FOR SERVER_xxxx IN EXCLUSIVE WAITING queues, one for each process in the list. The lock request in EXCLUSIVE for each SERVER_xxx will also specify a completion AST called a FAIL_AST.

Thus, the exclusive lock requests made on behalf of the special server by the SPECIAL_AST provides reverse links between the special server and all of the other parts of the application program through the waiting queues of the SERVER_xxx resources.

Whenever a particular CPU fails, the granted lock for the SERVER$_{xxx}$ of the process running on that CPU will be removed form the granted queue by the lock manager and the EXCLUSIVE lock request made by the special server will then be granted. Accordingly, the FAIL_AST completion routine will interrupt the running of the process on the special server. The FAIL_AST runs a routine to identify which process has failed through the use of the unique name of the SERVER_xxx resource for which the special server has been granted the EXCLUSIVE lock and can, for example, either send a message to a specified mailbox or call a routine prepared by the developer of the application program to automatically handle a failure of a part of the program.

The use of forward and reverse links through the lock manager queues with the SPECIAL_AST and FAIL_AST completion routines provides an automatic failure notification mechanism which is conveniently implemented by the insertion of a single call subroutine instruction in each of the several parts of the application program.

DETAILED DESCRIPTION

Figure 1:
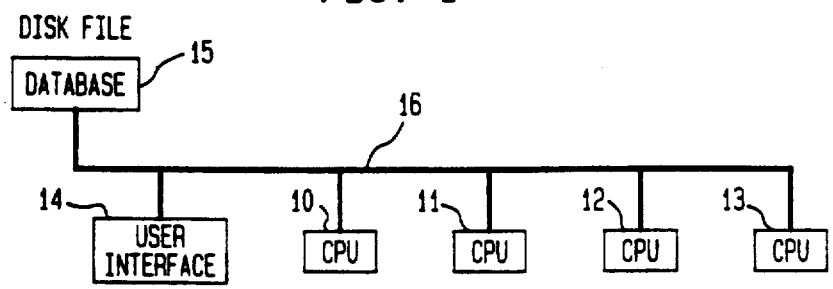
FIG. 1 is a block diagram of a computer network.

Referring now to FIG. 1, there is illustrated a computer network including several CPU's 10, 11, 12, 13, a user interface 14 and a disk file database 15. The CPU's 10, 11, 12, 13, user interface 14 and disk file 15 are all coupled to one another by a common bus 16. Each of the CPU's 10, 11, 12 and 13 comprises a self-contained data processing unit with its own main memory and can communicate with the other components of the network over the common bus 16. The disk file data base 15 is a shared resource that is accessible to all of the CPU's 10, 11, 12, 13 and the user interface 14.

Figure 3:
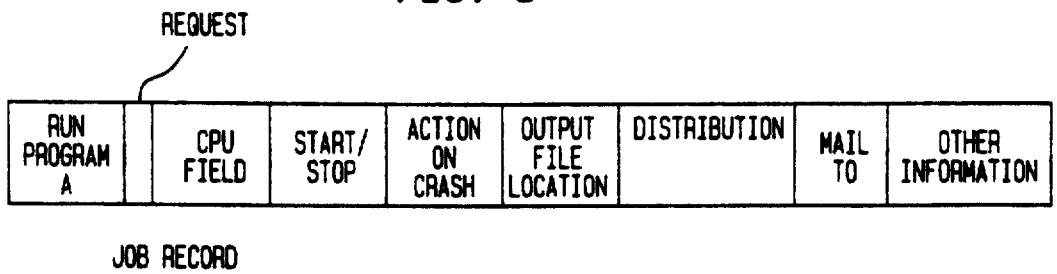
FIG. 3 is a detail of a job record stored in the disk file of the computer network illustrated in FIG. 2.
Figure 2:
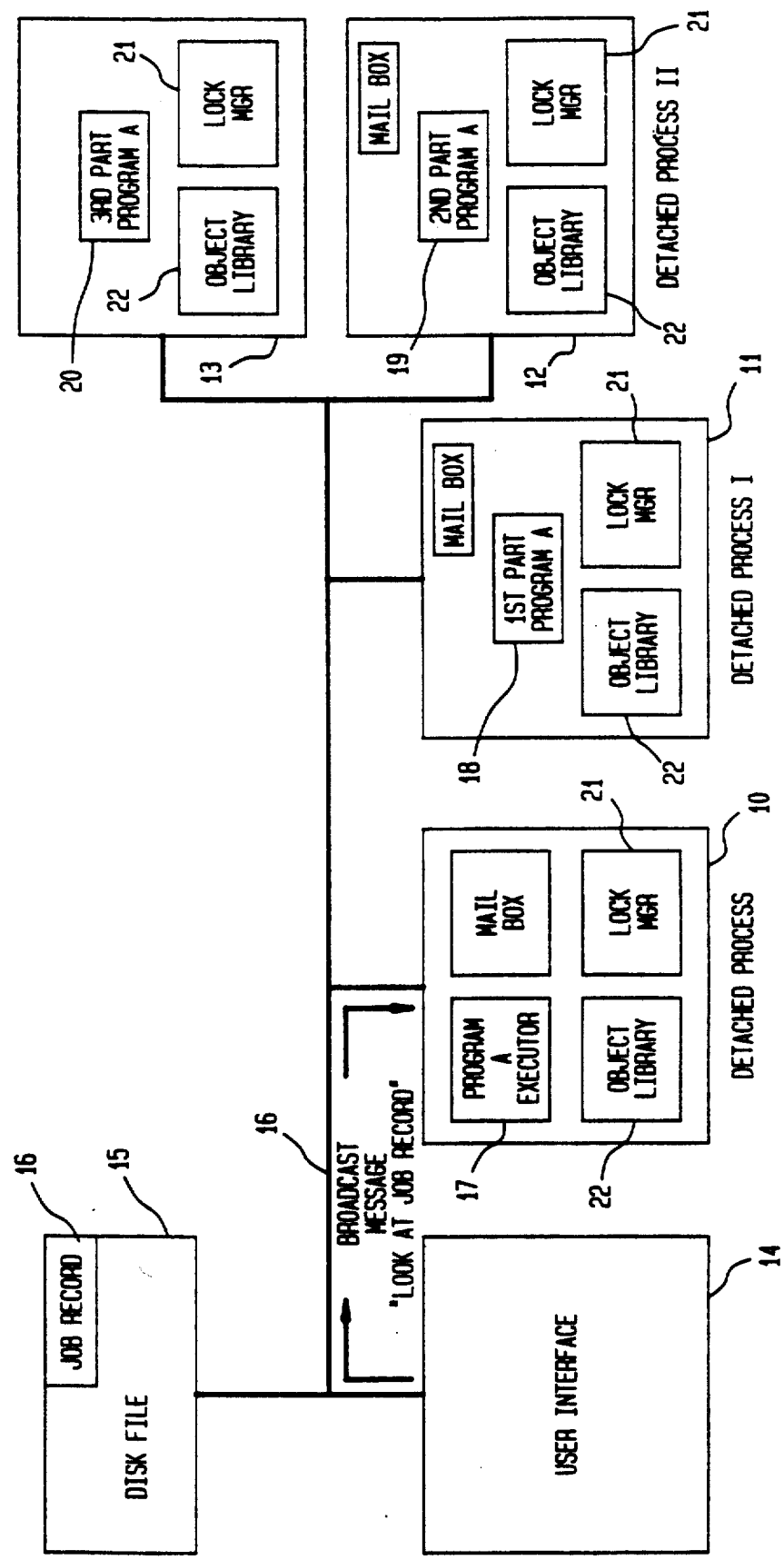
FIG. 2 is a block diagram of the computer network of FIG. 1 including an illustration of a program running on several components of the computer network.

Referring to FIGS. 2 and 3, the disk file database 15 contains a job record 16 for each application program on the network. As illustrated in FIG. 3, the job record 16 is a data field containing information which identifies the program and indicates such pertinent attributes of he program as, for example, a run program instruction, a request to run program, a CPU field to identify the CPU's 10, 11, 12, 13 where the program is to be run, a distribution list to identify which parts of the program are to be run separately on the various CPU's 10, 11, 12, 13, action to be taken upon the crash of anyone of the CPU's, a data output file location, a mail box location to receive messages and any other information required to run the program on the network.

To run a program, a network operator will utilize the user interface 14 to access the job record 16 for the program in the disk file database 15 and insert a request to run the program into the request to run program field of the job record 16. The network operator will then instruct a program executor 17 on, e.g., CPU 10, to look at the job record 16 of the application program.

The program executor 17 will read the data in the job record 16, including the request to run the program inserted by the network operator, and implement the execution of the application program in accordance with the information contained in the job record 16. For example, the program may comprise a batch data processing program which specifies, in its distribution field that three different parts 18, 19, 20 of the program are to be run concurrently, one on each of the CPU's 11, 12, 13.

Pursuant to a feature of the invention, each of a distributed lock manager 21 and an object library 22 is located on each CPU 10, 11, 12, 13. The object library 22 contains a series of subroutines that can be called by each part 18, 19, 20 of the application program. The subroutines operate through the use of the lock manager 21 to assign notification responsibility to one of the parts 18, 19, 20 (hereinafter referred to as the special server) and form links and reverse links between the special server and the other parts 18, 19, 20 of the application program.

The distributed lock manager 21 can comprise a VMS Distributed Lock Manager which permits a process to name a resource and request a specified "lock" on the resource name. The resource can be any logical or physical resource in the computer network and the lock represents a write and read access privilege to the resource. The specific type of lock is referred to as a lock mode. The various lock modes available on the VMS Distributed Lock Manager are as follows:

| Lock Mode | Mode Name | Lock Description |
|---|---|---|
| NULL MODE (NL) | LCKSK_NLMODE | This mode sets a holder in the name space and indicates future interest in the resource. Later, the lock can be converted to a higher lock mode more quickly than if the lock were initiated in that mode. |
| CONCURRENT READ (CR) | LCKSK_CRMODE | This mode allows one process to read data from a resource in an unprotected manner while other processes can modify the data. This mode is typically used when sharing processes are only reading data. |
| CONCURRENT WRITE (CW) | LCKSK_CWMODE | This mode allows one process to write data in an unprotected manner while other processes can simultaneously write data to the same resource. |
| PROTECTED READ (PR) | LCKSK_PRMODE | This mode allows processes to share read access to a resource, but not to write to the resource at the same time. |
| PROTECTED WRITE (PR) | LCKSK_PWMODE | This mode allows a process write access to the resource, and allows other processes to read from but not write to the resource at the same time. The other processes must have concurrent read access. |
| EXCLUSIVE (EX) | LCKSK_EXMODE | This mode allows write access to the resource and prevents other processes from reading from or |

-continued

| Lock Mode | Mode Name | Lock Description |
|---|---|---|
| | | writing to the resource. This lock prevents any other cooperating process from taking ownership until the process granted the EXCLUSIVE lock mode releases the resource. |

The lock modes provide a facility to coordinate access to a resource among various processes running throughout a computer network. For example, the EXCLUSIVE lock mode makes a process the owner of a named resource since no other process can either read from or write to the resource while it is in the EXCLUSIVE lock mode. On the other hand, a PROTECTED WRITE lock mode is less restrictive because, while only one process can write to the named resource, other processes are free to read from the named resource. The other lock modes are less restrictive to provide varying degrees of concurrent and exclusive read and write access privileges to a named resource.

The lock manager 21 does not actively enforce the lock scheme so that it is important that each process makes an appropriate lock request before attempting to access a resource for proper operation of the lock scheme. Enforcement of the lock scheme is implemented by enforcing a convention by, e.g., always having a process make the appropriate lock request for a named resource and permitting the process to proceed only if the lock request is granted.

For example, if a process wants to read from a database that is a named resource, the process will request a CONCURRENT READ lock on the database. If that database is already subject to a granted EXCLUSIVE lock mode, the granting of the request for CONCURRENT READ will not be compatible with the already granted EXCLUSIVE lock mode for the resource. Thus, the lock manager 21 will not grant the request for CONCURRENT READ.

The following table illustrates the compatibility between the various lock modes of the lock manager 21:

| Lock Mode Compatibility | | | | | | |
|---|---|---|---|---|---|---|
| Mode | NL | CR | CW | PR | PW | Ex |
| NL | Yes | Yes | Yes | Yes | Yes | Yes |
| CR | Yes | Yes | Yes | Yes | Yes | No |
| CW | Yes | Yes | Yes | No | No | No |
| PR | Yes | Yes | No | Yes | No | No |
| PW | Yes | Yes | No | No | No | No |
| EX | Yes | No | No | No | No | No |

The lock manager 21 interacts with processes running on the various CPU's of the computer network through certain system services made available to the processes, as follows:

| Lock Manager Services | | |
|---|---|---|
| Service Name | Meaning | Function |
| $ENQ | Enqueue lock request | Requests a lock on a resource or converts a resource lock mode. |
| $ENQW | Enqueue lock request and wait | Requests a lock or lock mode conver- |

-continued

| Lock Manager Services | | |
|---|---|---|
| Service Name | Meaning | Function |
| | | sion on a resource, and waits for the lock to be granted or converted. |
| $GETLKI | Get lock information | Requests information about the lock database $GETLKI does not wait for the information to be returned. |
| $GETLKIW | Get lock information and wait | Requests information about the lock database. $GETLKIW waits for the information to be returned. |
| $DEQ | Release lock request (dequeue) | Performs one of the following functions: * Unlocks granted locks * Cancels a queued lock request that has not been granted. |

The lock manager 21 maintains a lock database that comprises a plurality of queues containing lock request information. Each named resource will have a series of queues for each lock mode including, for each lock mode, a granted queue that lists the processes granted the lock mode, a waiting queue that lists outstanding requests by processes which have not been granted because the lock mode requested is incompatible with another already granted lock request and a conversion queue that lists lock requests granted at one mode and waiting for conversion to another lock mode.

The lock manager 21 will process each lock request by referring to the lock database to check for compatibility with already granted requests and then proceed to either grant the lock request or place the request in a waiting queue. When a process releases a granted lock mode, the lock manager 21 will look up the waiting queue for that lock mode and then grant the lock mode, on a first come, first served basis, to the next lock request in the waiting queue.

The lock manager 21 also maintains a lock status block for each lock for a resource name to indicate into which queue the lock requests for that lock has been placed. A lock valve block is linked to each lock status block. The lock valve block can comprise, e.g., 16 bytes of information that can be either read or written by the processes granted the lock request for that lock. The lock valve block will be available to a next process when it is granted the lock request for the lock mode of the named resource. Thus, the lock valve block can be utilized as a communication facility to pass 16 byte messages between processes.

Moreover, each lock request can specify a completion AST or a blocking AST to synchronize resource access among the processes running on the computer network. As discussed above, a completion AST will interrupt a process when a lock request made by the process is granted and a blocking AST will interrupt the process when another process makes a lock request that is incompatible with the lock request already granted to the process.

In accordance with a feature of the invention, the object library 22 residing in each of the CPU's 11, 12, 13 contains a set of linked subroutines that can be called directly or indirectly by respective ones of the co-operating parts 18, 19, 20 of the application program running on the CPU's 11, 12, 13, respectively. The subroutines are SETUP, CLUSTER_BROADCAST, MSG_AST, SPECIAL_AST, FAIL_AST, LIST_SERVER, SHOW_SERVER and UPDATE_INFO. The subroutines utilize the lock manager 21 to link and reverse link the co-operating application parts 18, 19, 20 by naming logical resources relating to the application parts 18, 19, 20 and making a series of compatible and incompatible lock requests on the named resource to link the parts 18, 19, 20 through the lock queues maintained by the lock manager 21. As discussed above, the logical resources include SPECIAL, BROADCAST, PERMISSION_TO_TALK, and a SERVER_xxx resource corresponding to each part 18, 19, 20 of the application program.

The developer of the application program can utilize the fail-over mechanism of the present invention by inserting a single call subroutine instruction in each part 18, 19, 20 of the application program to call the SETUP routine from the object library 22 in the CPU 11, 12, 13 where the part is running. The call subroutine instruction will specify the SETUP routine and provide an argument to uniquely identify the application program to which the part calling the subroutine belongs. The call subroutine can also provide an argument identifying an existing mail box channel in the network for receiving messages from the fail-over mechanism. A zero indication from the mailbox channel will tell the SETUP routine to open a mailbox channel for the application program. Alternatively, the argument can specify an asynchronous system trap written by the program developer which is to interrupt the application program and run upon a failure notification. The asynchronous system trap can specify corrective actions.

All of the subroutines running on a particular CPU 11, 12, 13 in the network co-operate to provide a common memory space in the main memory of the respective CPU 11, 12, 13 to store information relating to the fail-over mechanism set up for the specific application program. The common memory space is automatically set up by the SETUP routine and is accessible to all of the routines in the object library 22. All of the names of the resources for a specific application program will contain a prefix corresponding to the specific application program, i.e. the prefix passed as an argument in the call to the SETUP routine. The common memory space stores information relating to the part 18, 19, 20 running on the specific CPU 11, 12, 13. The information indicates that the part 18, 19, 20 has called SETUP and is in the fail-over mechanism and, further, whether the part is the special server.

Figure 4:
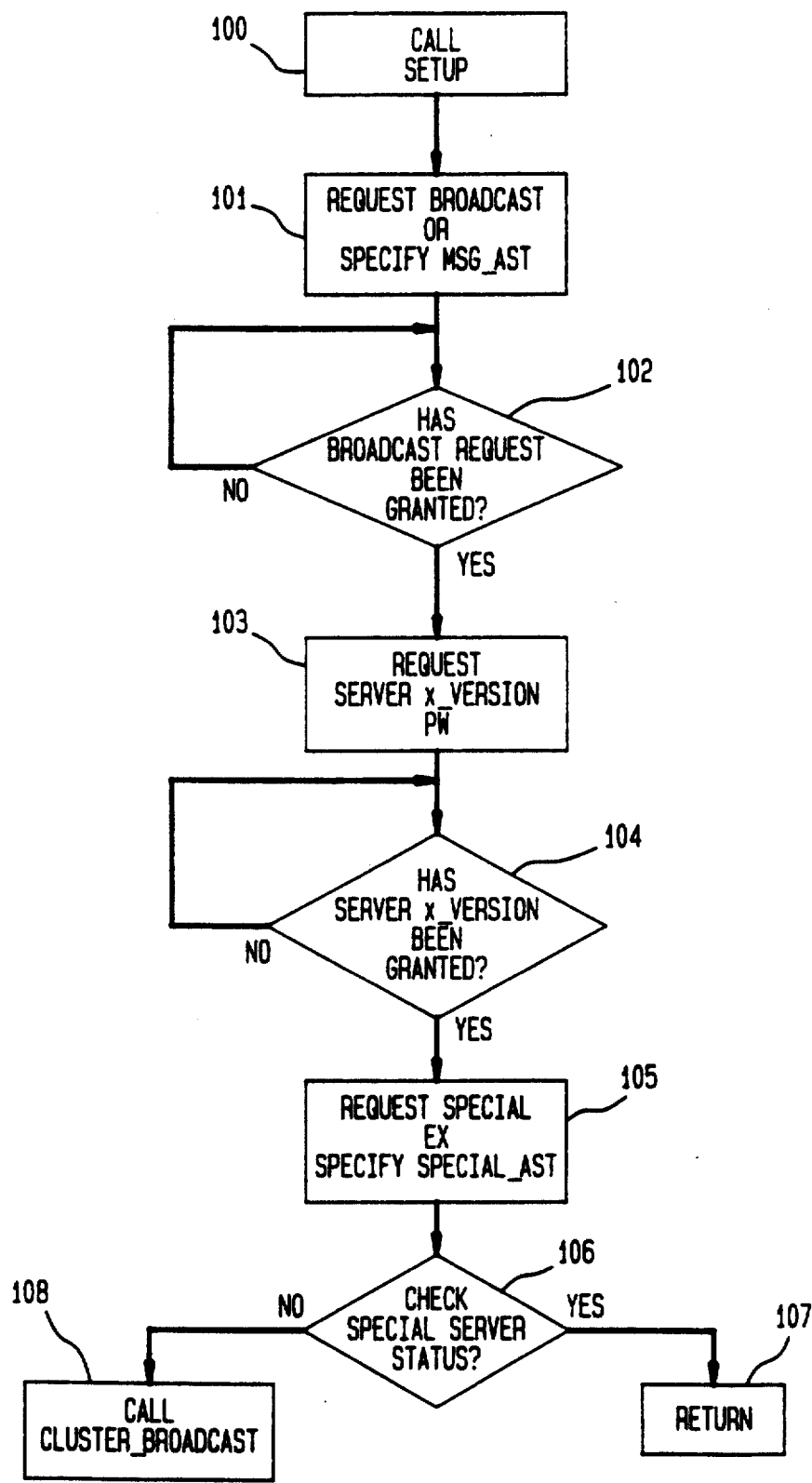
FIG. 4 is a flow chart of a SETUP routine according to the present invention.

Referring to FIG. 4, there is illustrated a flow chart of the SETUP routine. The call SETUP instruction 100, as indicated, is in each part 18, 19, 20 of the application program such that the routine will be run separately for each part 18, 19, 20. The SETUP routine starts by making a request for the BROADCAST resource in a CONCURRENT READ lock mode 101 on behalf of the part that called the SETUP routine by utilizing the $ENQW service of the lock manager 21. The SETUP routine then waits for the lock mode to be granted 102. The $ENQW service automatically waits for the granting of the lock. The loop illustrated in the flow chart is for illustration purposes to indicate that the routine does not proceed until the lock is granted. The lock will be granted since all of the SETUP routines request CONCURRENT READ which are compatible with one another. The request for the BROADCAST resource will also specify the MSG_AST routine which is a blocking AST, as will be described in more detail below.

After the granting of the request for the BROADCAST resource, the SETUP routine then makes a request 103 for a resource which it names in the request, e.g., after the node (i.e. the CPU 11, 12, 13 where the part 18, 19, 20 is running), e.g. SERVER_CPU 11 in a PROTECTED WRITE lock mode. The VMS system used in the representative embodiment of the present invention provides a service called $GETSYI which can be called by any process to identify the node in the network where the process is running. Alternatively, the SERVER_xxx resource can be named directly after the part 18, 19, 20 which called the SETUP routine. All that is required in that the resource name be unique to the specific part 18, 19, 20 of the application program. The SETUP routine will again use the $ENQW service of the lock manager 21. The SETUP routine then waits 104 for the request for the SERVER_xxx to be granted. This request will also be granted since each SETUP routine is requesting a PROTECTED WRITE lock mode on a specific resource named after its corresponding node which is different than the resource names for which a lock is being requested by the other SETUP routines.

The SETUP routine will then make a request through the $ENQ service for the SPECIAL resource in an EXCLUSIVE lock mode 105. The request for the SPECIAL resource specifies the SPECIAL_AST which is a completion AST. Since all of the SETUP routines are making a request in EXCLUSIVE, only one of the SETUP routines, usually the first in time to make the request, will be granted the EXCLUSIVE lock mode. The other requests made by the other SETUP routines running on the network will each be incompatible with the granted EXCLUSIVE lock mode. These requests will then be placed in a REQUEST FOR SPECIAL IN EXCLUSIVE WAITING queue by the distributed lock manager 21. As indicated, the part 18, 19, 20 granted the EXCLUSIVE lock mode is referred to as the special server and the SETUP routine for that part 18, 19, 20 sets a bit in the respective common memory space to indicate special server status.

After making the request for the SPECIAL resource in an EXCLUSIVE lock mode, the SETUP routine checks the common memory to see if the corresponding part 18, 19, 20 is the special server 106. If the corresponding part 18, 19, 20 is the special server, the SETUP routine returns control to the part 18, 19, 20

(107). If the corresponding part 18, 19, 20 is not the special server, the SETUP routine proceeds to call the CLUSTER BROADCAST routine 108, which will be explained in more detail below together with the related MSG_AST blocking routine and the BROADCAST resource.

Since each SETUP routine specifies the SPECIAL_AST completion routine in the request for the SPECIAL resource, the one part 18, 19, 20 granted the SPECIAL resource in an EXCLUSIVE lock mode through the called SETUP routine will be interrupted by the SPECIAL_AST routine.

Figure 5:
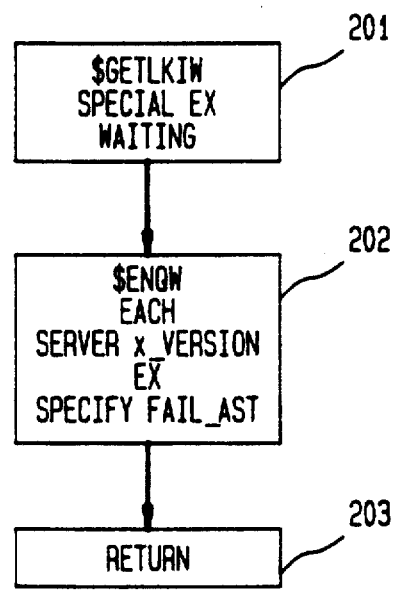
FIG. 5 is a flow chart of a SPECIAL AST routine according to the present invention.

Referring now to FIG. 5, there is illustrated a flow chart of the SPECIAL_AST completion routine. The SPECIAL_AST routine initially utilizes the $GETLKIW service 201 of the lock manager 21 to obtain a list of all processes currently in the REQUEST FOR SPECIAL IN EXCLUSIVE WAITING queue. The SPECIAL_AST then makes a request 202 for an EXCLUSIVE lock mode through the $ENQW service of the lock manager 21 for each of the SERVER_xxx resources corresponding to the processes in the list obtained from the $GETLKIW service. The SPECIAL_AST can either refer to the job record 16 or use the $GETSYI service to correlate the part 18, 19, 20 to the node name where the part is running. Thus, SPECIAL_AST can formulate the SERVER_xxx names of the resources for which it makes the requests for an EXCLUSIVE lock.

Each request for the SERVER_xxx will specify the FAIL AST blocking routine. As should be understood, each request for the SERVER_xxx resources made by the SPECIAL_AST will be incompatible with the PROTECTED WRITE lock mode already granted to each process on the list (See 103, 104 FIG. 4). Thus, the request made by SPECIAL_AST on behalf of the special server will each be placed in a respective REQUEST FOR SERVER_xxx EXCLUSIVE WAITING queue by the lock manager 21. After making all of the requests 202, the SPECIAL_AST will return control to the part 18, 19, 20 made special server 203.

Figure 6:
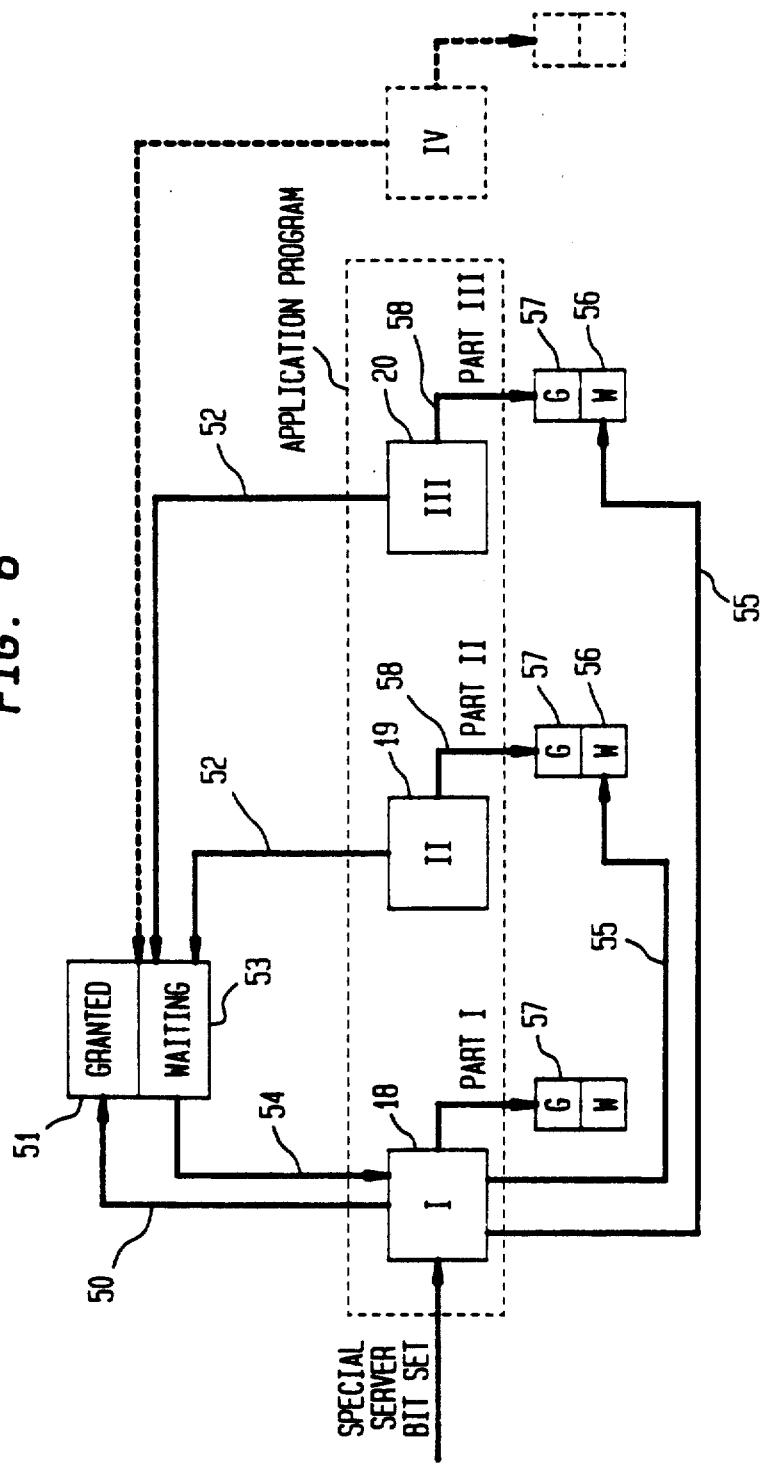
FIG. 6 is a logical block diagram of several parts of an application program linked and reverse linked to one another through lock manager queues according to the present invention.

Referring now to FIG. 6, there is illustrated a logical block diagram of the parts 18, 19, 20 of the application program as linked and reverse linked by the running of the SETUP and SPECIAL_AST routines. As noted earlier, each of the several SETUP routines called by the parts 18, 19, 20 stores information regarding the corresponding part 18, 19, 20 in a common memory space in the respective CPU 11, 12, 13. The SPECIAL_AST routine for the part 18, 19, 20 granted the EXCLUSIVE lock mode for the SPECIAL resource sets a bit in the field of the common memory space associated with the information on the corresponding part 18, 19, 20 to indicate special server status.

Assuming part 18 has been granted the EXCLUSIVE lock mode for the SPECIAL resource, the corresponding lock request made by part 18 through the SETUP routine in the object library 22 resident in the CPU 11, where part 18 is running, will be in the granted queue 51 for the EXCLUSIVE lock mode of the SPECIAL resource maintained by the distributed lock manager 21. The queue listing 51 and the special server status bit link 50 the part 18 to the lock manager 21.

A forward link between the special server and the other parts 19, 20 not granted the EXCLUSIVE lock mode on SPECIAL is provided by the REQUEST FOR SPECIAL IN EXCLUSIVE WAITING queue 53, which is acessible 54 to the special server through the $GETLKI service of the lock manager 21 (See FIG. 5).

A reverse link 55 between the special server and each other part 19, 20 of the application program is provided by the REQUEST SERVER_xxx EXCLUSIVE WAITING queues 56 set up by the lock manager 21 upon the making of the EXCLUSIVE requests on behalf of the special server (part 18) by the SPECIAL_AST 202 (FIG. 5). Of course, each SERVER_xxx resource will have a corresponding granted queue 57 for the PROTECTED WRITE mode which contains the rquest made by the SETUP routines on behalf of the corresponding part 18, 19, 20. The granted queues 57 complete the reversed link 55 through the link 58 between each part 19, 20 and the corresponding granted queue 57.

The phantom line indication of a fourth part of the application represent an additional part which may enter the network after the running of the SPECIAL_AST. The setting up of the reverse link between the special server and the new part will be explained later in connection with the BROADCAST resource.

The LIST_SERVER, UPDATE_INFO and SHOW_SERVER routines in the object library 22 are all provided as services to any application developer so that an application developer can call any one of the routines to utilize the services of the lock manager 21 in respect of the resources named by the fail-over mechanism.

For example, each part 18, 19, 20, can call the UPDATE_INFO routine to write information regarding the part such as, e.g. software ID, version no., step currently executing, etc., into the lock value block associated with the lock for the corresponding SERVER_xxx resource. The UPDATE INFO routine permits an application developer to utilize the lock value block feature of the VMS lock manager 21.

The SHOW_SERVER routine enables any process running in the network to obtain and read the lock value block of the SERVER_xxx of any part 18, 19, 20 to obtain the information in the lock value block. Moreover, the LIST_SERVER routine enables any process running in the network to list the requests in the lock manager queues to thereby obtain information regarding the parts of a specific application program and where they are running.

A feature of the VMS Distributed Lock Manager includes a monitoring function of the operation of the components within the network. When one of the, e.g., CPU's 11, 12, 13 fails, the distributed lock manager 21 will invalidate the lock requests made from processes on the failed CPU and reform the queues accordingly.

Thus, the granted queue for the SERVER_xxx of the part 19, 20 running on the failed CPU will be emptied and the lock manager 21 will look up and grant the waiting request for EXCLUSIVE on the SERVER_xxx made by the SPECIAL_AST on behalf of the special server. The FAIL_AST completion routine specified by the EXCLUSIVE request (See FIG. 5) will then interrupt the running of part 18 and execute.

Figure 7:
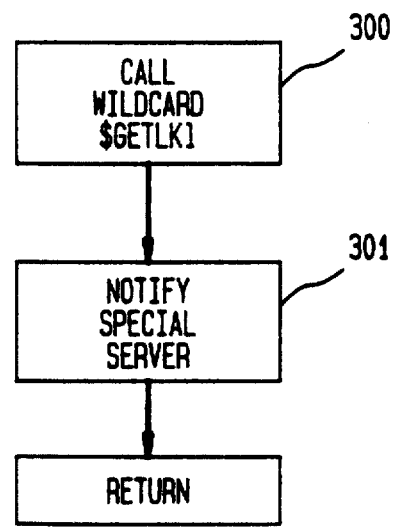
FIG. 7 is a flow chart of a FAIL_AST routine according to the present invention.

Referring now to FIG. 7, there is illustrated a flow chart of the FAIL_AST completion routine. The FAIL_AST first calls a wild card $GETLKIW 300 to obtain information on the specific EXCLUSIVE request that has been granted to the special server. A wild card $GETLKIW returns information on all of the lock requests of a process and will therefore return information on all of the SERVER_xxx resource queues to the part that is the special server. The one wherein the special server is the holder of the EXCLUSIVE lock mode corresponds to the part 19, 20 running on the CPU 12, 13 which has failed. The name of the resource enables the FAIL_AST to identify the part 19, 20 whch has failed due to a CPU malfunction. For example, in the representative embodiment disclosed herein, the FAIL_AST can look up the job record 16 for the application program and correlate the node name used to name the SERVER_xxx to the part 18, 19, 20 running on the node.

The FAIL_AST will then notify 301 the special server by either writing a failure message identifying the failed part to the mailbox specified in the call subroutine instruction argument inserted into the part or call an asynchronous system trap specified by the application developer. Either way, information on the failure of the one part of the application program is automatically provided to the application program in such a manner that corrective action can be taken. For example, the asynchronous system trap specified in the call to SETUP can read the job record 16 field containing the action to be taken on crash information.

Figure 8:
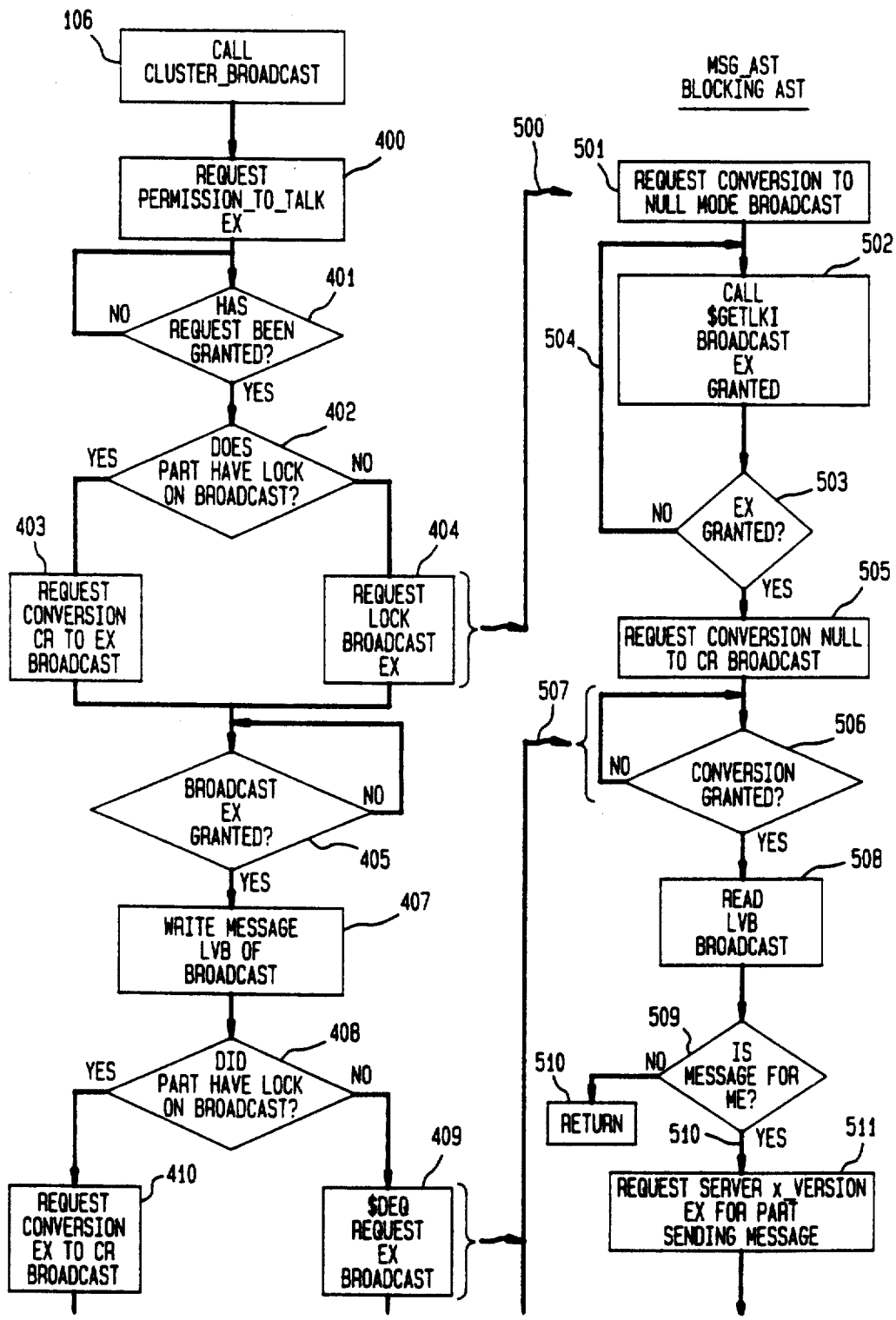
FIG. 8 illustrates side-by-side flow charts for the CLUSTER_BROADCAST and MSG AST routines according to the present invention.
Figure 8:
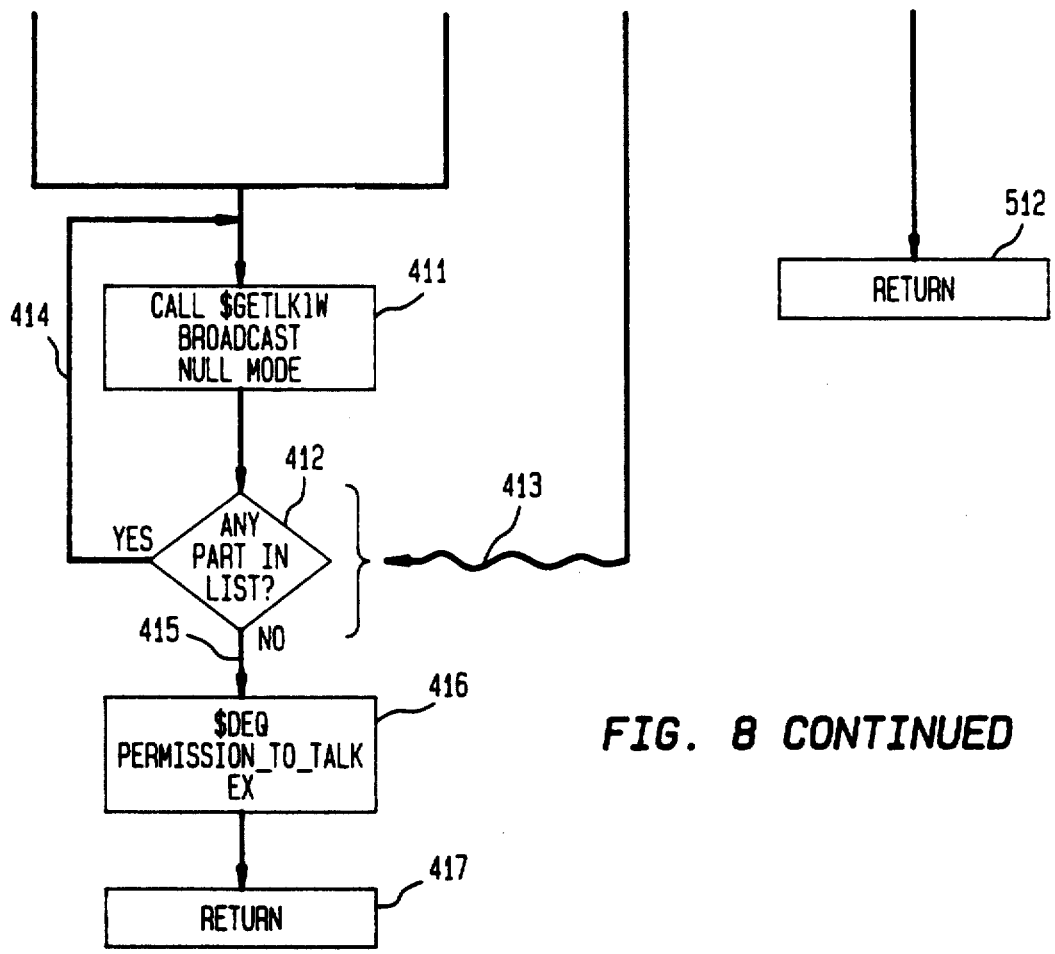

Referring now to FIG. 8, there is illustrated side-by-side flow charts for the CLUSTER_BROADCAST and MSG_AST routines of the object library 22. The CLUSTER_BROADCAST and MSG_AST routines run in conjunction with the locking scheme for the BROADCAST and PERMISSION_TO_TALK resources to provide a communication facility between the parts 18, 19, 20 of the application program. As illustrated in FIG. 4, the SETUP routine calls CLUSTER_BROADCAST 106 immediately after making a request for the EXCLUSIVE lock on SPECIAL 105 if the corresponding part 18, 19, 20 is not the special server.

In the event a part that is not the special server (See, e.g., phantom line in FIG. 6) starts running after the SPECIAL_AST has finished, the special server would not have included a request for the SERVER_xxx resource corresponding to the new part. This is because the SETUP routine called by the new part would not have made a request for the SPECIAL resource in EXCLUSIVE until after the SPECIAL_AST has run and thus, the request made by the new part would not have been in the REQUEST FOR SPECIAL IN EXCLUSIVE WAITING queue.

The CLUSTER_BROADCAST routine is utilized to send two types of messages. One type is a predefined message that the MSG_AST routine will recognize and perform certain actions in response thereto. Examples of predefined messages are a message sent by the SETUP routine upon the entry of a new part into the network and a message sent by SPECIAL_AST when a new part becomes special server. The other type of message can be passed directly to the application program, e.g. passed to the mailbox specified in the call soubroutine argument.

The CLUSTER_BROADCAST routine initially makes a request for the PERMISSION_TO_TALK resource in the EXCLUSIVE lock mode 400. The CLUSTER_BROADCAST routine waits 401 until the request has been granted and then looks to see if it already has a lock on the BROADCAST resource 402. This can be accomplished by looking into the common memory set up by the SETUP routine to see if the process calling CLUSTER_BROADCAST previously called the SETUP routine.

If the part which called the CLUSTER_BROADCAST routine does have a lock on the BROADCAST resource i.e. the CONCURRENT READ lock obtained by the SETUP routine, the CALL_BROADCAST routine will proceed to request a conversion from the CONCURRENT READ lock mode to the EXCLUSIVE lock mode for BROADCAST 403.

If the part which called CLUSTER_BROADCAST does not have a lock on BROADCAST, the CLUSTER_BROADCAST routine will make a new request for the BROADCAST resource in the EXCLUSIVE lock mode 404. This aspect of the CLUSTER_BROADCAST routine makes the communication facility available to any process running on the network, whether it is a part of the application program or not. Thus, any process can send a message to the application program even if it is not a part of the program.

Once either the request for conversion or new request for the BROADCAST resource is made, the MSG_AST blocking routine specified by each part 18, 19, 20 of the application program (See 101, FIG. 5) will interrupt the respective part 18, 19, 20 and runs 500. The blocking routine will run at this time since the EXCLUSIVE request made by the new part is incompatible with the CONCURRENT READ lock mode previously granted to each part (See 102, FIG. 5). The MSG_AST routine initially makes a request to convert the CONCURRENT READ lock on the BROADCAST resource to the NULL mode, which is compatible with the EXCLUSIVE lock mode sought by the new part (501).

After the request for conversion is made, the MSG_AST routine utilizes the $GETLKI service 502 of the lock manager 21 to obtain information on the granted EXCLUSIVE lock queue of the BROADCAST routine to see if the new part has been granted the EXCLUSIVE lock mode 503. If the lock mode has not been granted, the routine loop back 504, e.g., every 100 milliseconds to 502 until the EXCLUSIVE lock mode has been granted. Once the EXCLUSIVE lock mode has been granted, the MSG_AST routine makes a request to convert the NULL mode for BROADCAST back to the CONCURRENT READ mode 505.

Meanwhile, the CLUSTER_BROADCAST waits 405 for the EXCLUSIVE lock mode to be granted. Once it is granted, the CLUSTER_BROADCAST routine writes a message 407 to the lock value block associated with the BROADCAST lock. If the process which called the CLUSTER_BROADCAST routine is a new part, the message is directed to the special server and identifies the new part of the application program.

After the completion of the message writing, the CLUSTER_BROADCAST routine looks to see if the calling process had a lock on BROADCAST prior to the calling of the CLUSTER_BROADCAST routine 408, i.e., whether the process is a part of the application program and made a request for a BROADCAST CONCURRENT READ lock through the SETUP routine, or is an unrelated process sending a message to the application program. If the process did not initially have a lock on BROADCAST, the CLUSTER_BROADCAST routine dequeues the EXCLUSIVE request 409. If the process did have a CONCURRENT READ lock, the CLUSTER_BROADCAST routine makes a request to convert the lock mode from EXCLUSIVE back to CONCURRENT READ 410.

The MSG_AST routine, having made a request to convert the lock mode from NULL to CONCURRENT READ 505, then waits for the conversion 506, which will be granted after the CLUSTER_BROADCAST request to dequeue or convert EXCLUSIVE 409, 410 is granted 507. The MSG_AST routine will then obtain and read 508 the lock value block.

A convention can be used in the lock value block to address a message. For example, an address field contained in the lock value block can indicate a node name to specify a message to a particular part of the application program, an asterisk in the address field can indicate that the message is directed to all of the parts 18, 19, 20 and a blank in the address field can indicate that the message is for the special server. If the message 509 is not for the part 18, 19, 20 which has been interrupted by the MSG_AST routine, the MSG_AST will return 510 control to the corresponding part 18, 19, 20.

If the message is for the special server, i.e. a blank in the address field of the lock value block, the MSG_AST will look at the special server status bit in the common memory and when it sees that it is set proceed 510 to read the message. The message will be the predefined message sent by SETUP that indicates that a new part has entered the network. The MSG_AST responds to the predefined message by making a request for an EXCLUSIVE lock mode for the SERVER_xxx resource corresponding to the new part 511. Before making the request, however, the MSG_AST can utilize the $GETLKI service of the lock manager 21 to verify whether an EXCLUSIVE lock mode request for the SERVER_xxx has already been made by the special server. This will occur if the new part in fact entered the network soon after the special server, e.g., with parts 19, 20, and the corresponding request for SPECIAL in EXCLUSIVE was in the REQUEST FOR SPECIAL IN EXCLUSIVE WAITING queue while the SPECIAL_AST was running. After the verifying and making of the request for EXCLUSIVE on the SERVER_xxx resource corresponding to the new part, the MSG_AST returns control to the special server (part 18) 512.

Meanwhile, the CLUSTER_BROADCAST routine completes by calling $GETLKI for the BROADCAST NULL mode 411. The CLUSTER_BROADCAST routine then checks to see if any of the other processes are still in the NULL mode 412, i.e. the request to convert has not yet been granted (505, 506) 413. If any of the requests have not yet been granted, the CLUSTER_BROADCAST routine loops 414 back to the $GETLKI instruction 411, e.g. every 100 milliseconds, until there is no part still waiting conversion from the NULL mode to the CONCURRENT READ mode. At that time, 415, the CLUSTER_BROADCAST routine dequeues the PERMISSION_TO_TALK EXCLUSIVE lock mode 416 and returns control to the new part 417.

Thus, the CLUSTER_BROADCAST routine, through the EXCLUSIVE lock on the PERMISSION_TO_TALK resource 400 and the waiting loops 414, 504 insures that the message written into the lock value block is received by the intended part of the application program, e.g., the special server. The PERMISSION_TO_TALK resource also orders messages since only one process at a time can send a message due to the EXCLUSIVE lock requirement for the PERMISSION_TO_TALK resource. All other processes wanting to send a message at the same time will be placed in a waiting queue for the EXCLUSIVE lock on the PERMISSION_TO_TALK resource. The requests will be granted subsequently, one at a time, on a first come, first served basis until each message is sent.

Moreover, the CLUSTER_BROADCAST routine can be used to notify the special server when a part is to leave the network prior to the rest of the parts of the application program. To accomplish a leave network broadcast, the application developer would have to insert a call CLUSTER_BROADCAST instruction into the part that will leave the network to send a message to the special server to, e.g. dequeue the EXCLUSIVE request for the SERVER_xxx corresponding to the departing part.

The CLUSTER_BROADCAST routine can also be used by the SPECIAL_AST to write a message to the other parts 19, 20 of the application program to indicate that it is the special server. This will be another predefined message using the asterisk (message for all parts) that causes each MSG_AST to write the identification of the special server in the respective common memory spaces.

In the event that the CPU where the special server (part 18 in our example) is running should fail, the lock manager 21 will remove the EXCLUSIVE lock on SPECIAL held by the special server and grant the EXCLUSIVE lock to the first part 19, 20 in the REQUEST FOR SPECIAL IN EXCLUSIVE WAITING queue. The SPECIAL_AST completion routine will then interrupt the part 19, 20 granted the EXCLUSIVE lock and run, as described above, to form the reverse links between the new special server and the SPECIAL_AST can also call CLUSTER_BROADCAST to send a message to each of the remaining parts indicating that it is now the special server for update of the respective common memory space. In addition, the SPECIAL_AST can look into the common memory space for the corresponding part that is now special server to see if it contains information on a previous special server, i.e. a message from a previous special server, as discussed above. If the common memory space for the new special server does have information on a special server, this will indicate to the SPECIAL_AST that there was a previous special server and thus indicate a failure. The SPECIAL_AST would then call a routine to act on the failure information as is done by the FAIL_AST.

An application developer can also specify a particular part 18, 19, 20 to be the special server through the use of another predefined message. The application developer would send the predefined message to each part (18, 19, 20) of the application program by calling CLUSTER_BROADCAST. The predefined message specifies which part is to be the special server and the MSG_AST'S act to implement the specified special server, as follows.

If the part 18, 19, 20 running on the CPU 11, 12, 13 where the MSG_AST is located is either the special server or not the special server but should be the special server, the MSG_AST's will simply return control to the part.

If the part is the special server and should not be the special server, the MSG_AST will dequeue the EXCLUSIVE lock on the SPECIAL resource and dequeue all of the locks for the SERVER_xxx resources. The MSG_AST will then once again request a lock in EXCLUSIVE for the SPECIAL resource and then exit.

If the part is not the special server and is also not the part designated by the application developer to be the special server, the MSG_AST will dequeue the request for SPECIAL in EXCLUSIVE and then again enqueue the request for SPECIAL in EXCLUSIVE before returning control to that part.

The releasing of the lock request for SPECIAL by each of the parts 18, 19, 20 not to be the special server will leave the one part designated by the application developer either already holding the EXCLUSIVE lock for the SPECIAL resource or alone in the waiting queue with no request in the granted queue. In the event of the later, the lock manager 21 will then grant the EXCLUSIVE lock to the part 18, 19, 20 designated by the application developer. The making of the request for SPECIAL in EXCLUSIVE by the other parts 18, 19, 20 after releasing any lock requests for SPECIAL will be after the part 18, 19, 20 designated by the application developer has obtained the EXCLUSIVE lock for SPECIAL. Thus, the other parts will be placed in the REQUEST FOR SPECIAL IN EXCLUSIVE WAITING queue.

What is claimed is:

1. A method for providing failure notification in a computer network having a plurality of nodes wherein a predetermined number of the nodes are each processing one part of an application program, which method comprises the steps of:

for each part o the application program, making a first request for an exclusive access privilege to a preselected resource name;

for each part of the application program, making a second request for a preselected access privilege to a corresponding resource name having a name based upon the respective part;

granting the first request for an exclusive access privilege to one and only one part of the application program;

granting the second request to each part of the application program;

making a third request on behalf of the one and only one part of the application program for each resource name having a name based upon a respective part of the application program other than the one and only one part; said third request being for an access privilege that is incompatible with each second request;

operating the computer network to:
(i) store information on each third request for a resource having a name based upon a respective part of the application program other than the one and only one part, and
(ii) upon a failure of one node of the predetermined number of nodes processing one part of the application program, automatically invalidating the second request of a respective part being processed on the failed node and automatically granting the third request made on behalf of the one and only one part of the application program for the resource name having a name based upon the respective part being processed on the failed node; and utilizing the grant of the third request for the resource name having a name based upon the respective part being processed on the failed node to cause a message to be generated to identify the respective part being processed on the failed node.

2. The method of claim 1 comprising the further step of utilizing the message to call a failure recovery routine.

3. The method of claim 1 comprising the further step of:

for the application part granted the first request, broadcasting a message to each other application part to identify the application part that was granted the first request.

4. The method of claim 3 comprising the further steps of:

for each application part that was not granted the first request, sending a message to the application part that was granted the first request to identify each respective application part, and for the application part granted the first request, reading each message of the previous step and verifying that a third request was made on behalf the application part granted the first request in respect of each application part that sent a message.

5. In a computer network including a plurality of nodes, wherein at least certain ones of the plurality of nodes have a CPU and wherein a predetermined number of the CPUs are each processing one part of an application program, a failure notification system which comprises:

a lock manager to receive and process requests for access privileges to resource names and to provide information on the request in response to a query; and an object library coupled to each one of the CPUs processing one part of the application program, the object library comprising a linked set of subroutines including:

i) a SETUP subroutine that can be called by an application part being processed on a CPU coupled to the object library, the SETUP subroutine comprising a sequence of instructions to issue a first request to the lock manager on behalf of the calling application part for an exclusive access privilege to a preselected resource name and to issue a second request to the lock manager on behalf of the calling application part for a preselected access privilege to a resource name based upon the calling application part;

ii) a SPECIAL_AST subroutine that is an asynchronous system trap called upon grant of the first request to the calling application part, the SPECIAL_AST subroutine comprising a sequence of instructions to query the lock manager for a list of all application parts of the application program that have made a first request through a SETUP subroutine and that have not been granted the first request and to issue a third request to the lock manager on behalf of the calling application part that has been granted the first request for an access privilege to each resource name based upon an application part that has not been granted the first request, each third request being for an access privilege that is not compatible with the predetermined access privilege of a second request; and iii) a FAIL_AST subroutine that is an asynchronous system trap called upon the grant of any third request to the calling application part that has been granted the first request, the FAIL_AST subroutine comprising a sequence of instructions to query the lock manager for information on the name of the resource based upon the application part for which the third request has been granted.

6. The failure notification system of claim 5, wherein the object library comprises a plurality of copies of the object library, each copy coupled to a respective CPU.

7. The failure notification system of claim 5, wherein the object library further includes a CLUSTER__BROADCAST subroutine called by another routine and comprising a sequence of instructions to issue a fourth request to the lock manager on behalf of the calling routine for an exclusive access privilege to a BROADCAST resource and, upon grant of the fourth request, to write a message on behalf of the calling routine to the lock manager for storage.

8. The failure notification system of claim 7, wherein the SETUP subroutine of the object library further includes instructions to issue a fifth request to the lock manager on behalf of the calling application part for a preselected access privilege to the BROADCAST resource, the preselected access privilege being compatible with multiple fifth request made on behalf of other application parts.

9. The failure notification system of claim 8, wherein the object library further includes an MSG__AST subroutine that is an asynchronous system trap called upon the making of a fourth request on behalf of a calling routine, the fourth request for an exclusive access privilege being incompatible with the preselected access privilege of the fifth request, the MSG__AST subroutine comprising a sequence of instructions to issue a sixth request to the lock manager on behalf of an application part being processed on a CPU coupled to the object library, when the respective application part is to receive a message, the sixth request being for a conversion of the preselected access privilege to the BROADCAST resource to a NULL access privilege so that the fourth request of the calling routine is granted.

10. The failure notification system of claim 9, wherein the MSG__AST subroutine further includes instructions to read the message stored by the lock manager on behalf of the calling routine.

11. The failure notification system of claim 10, wherein the calling routine is the SETUP subroutine.

12. The failure notification system of claim 11, wherein the SETUP subroutine calls the CLUSTER__BROADCAST subroutine to send a message on behalf of a respective calling application part to an application part granted the first request, the message indicating that the respective calling application part is being processed on a CPU.

13. The failure notification system of claim 12, wherein the MSG__AST subroutine further includes instructions to verify, upon reading a message indicating that a respective calling application part is being processed, that its respective application part was granted a first request and when its respective application has been granted a first request, to verify that a third request was made in request of the calling application part.

14. The failure notification system of claim 10, wherein the calling routine is the SPECIAL__AST subroutine.

15. The failure notification system of claim 14, wherein the SPECIAL__AST subroutine calls the CLUSTER__BROADCAST subroutine upon the grant of a first request on behalf of a respective application part, to send a message on behalf of the respective application part to all other application parts, the message indicating that the respective application part has been granted a first request.

16. The failure notification system of claim 15 further comprising a memory space associated with each CPU processing an application part, for storage of information on an application part that has sent a message indicating that it has been granted a first request.

17. The failure notification system of claim 10 further comprising:
a first looping routine in the MSG__AST subroutine including an instruction loop to periodically query the lock manager for information on the granting of a fourth request made on behalf of a calling routine by the CLUSTER__BROADCAST subroutine until the information indicates that the fourth request has been granted;
the MSG__AST subroutine including further instructions subsequent to the first looping routine to issue a seventh request to the lock manager, upon the first looping routine receiving information on the grant of the fourth request, for conversion of the NULL access privilege back to the preselected access privilege to the BROADCAST resource.

18. The failure notification system of claim 17, wherein:
the CLUSTER__BROADCAST subroutine includes further instructions to issue an eighth request to the lock manager to release the exclusive access privilege on the BROADCAST resource after the CLUSTER__BROADCAST subroutine writes a message, and
further comprising:
a second looping routine in the CLUSTER__BROADCAST subroutine including an instruction loop to periodically query the lock manager, after release of the exclusive access privilege on the BROADCAST resource, for information on all existing NULL access privileges to the BROADCAST resource;
the CLUSTER__BROADCAST subroutine returning control to the calling routine when the information on all existing NULL access privileges indicates that there is no NULL access privilege for the BROADCAST resource;
so that the first and second looping routines synchronize and coordinate the running of the CLUSTER__BROADCAST subroutine and the MSG__AST subroutine to transmit messages from a calling routine to application parts.

19. The failure notification system of claim 16, wherein the SPECIAL__AST subroutine further includes instructions to access the memory space associated with the CPU processing the calling application part to read the information on an application part granted a first request to verify that the calling application part is a first application part granted a first request.

20. The failure notification system of claim 19, wherein the SPECIAL__AST subroutine further includes instructions causing a message to be generated, when the calling application part was not the first application part identified in the information stored in the memory space; the message indicating that the node processing the first application part has failed.

21. The failure notification system of claim 7, wherein the CLUSTER__BROADCAST subroutine issues the fourth request for an exclusive access privilege to the BROADCAST resource by making a request to the lock manager for an exclusive access privilege to a PERMISSION_TO_TALK resource and, upon the grant of the exclusive access privilege to the PERMISSION_TO_TALK resource, issuing the fourth request.

22. The failure notification system of claim 5, wherein the FAIL_AST subroutine further includes instructions to cause a message to be generated to identify the name of the resource based upon the application part for which the third request has been granted.

23. The failure notification system of claim 5, wherein the FAIL_AST subroutine further includes instructions to call a failure recovery routine and to provide the information to the failure recovery routine.

24. For use in a CPU adapted to be coupled to a computer network, the computer network including a lock manager to receive and process requests for access privileges to resource names and to provide information on the requests in response to a query and wherein the CPU is adapted to process one part of an application program, an object library, which comprises:
a linked set of subroutines including:
i) a SETUP subroutine that can be called by the application part processed on the CPU, the SETUP subroutine comprising a sequence of instructions to issue a first request to the lock manager on behalf of the calling application part for an exclusive access privilege to a preselected resource name and to issue a second request to the lock manager on behalf of the calling application part for a preselected access privilege to a resource name based upon the calling application part;
ii) a SPECIAL_AST subroutine that is an asynchronous system trap called when the first request has been granted to the calling application part, the SPECIAL_AST subroutine comprising a sequence of instructions to query the lock manager for a list of all application parts of the application program hat have made a first request through a SETUP subroutine and that have not been granted the first request and to issue a third request to the lock manager on behalf of the calling application part that has been granted the first request for an access privilege to each resource name based upon an application part that has not been granted the first request, each third request being for an access privilege that is not compatible with the predetermined access privilege of a second request; and
iii) a FAIL_AST subroutine that is an asynchronous system trap called upon the grant of any third request to the calling application part when the application part has been granted the first request and after the SPECIAL_AST has run, the FAIL_AST subroutine comprising a sequence of instructions to query the lock manager for information on the name of the resource based upon the application part for which the third request has been granted.

25. The object library of claim 24, wherein the object library further includes a CLUSTER_BROADCAST subroutine called by another routine being processed on the CPU, the CLUSTER_BROADCAST subroutine comprising a sequence of instructions to issue a fourth request to the lock manager on behalf of the calling routine for an exclusive access privilege to a BROADCAST resource and, upon grant of the fourth request, to write a message on behalf of the calling routine to the lock manager for storage.

26. The object library of claim 25, wherein the SETUP subroutine of the object library further includes instructions to issue a fifth request to the lock manager on behalf of the calling application part for a preselected access privilege to the BROADCAST resource, the preselected access privilege being compatible with multiple fifth requests made on behalf of other application parts.

27. The object library of claim 26, wherein the object library further includes an MSG_AST subroutine that is an asynchronous system trap called upon the making of a fourth request on behalf of a calling routine, the fourth request for an exclusive access privilege being incompatible with the preselected access privilege of the fifth request, the MSG_AST subroutine comprising a sequence of instructions to issue a sixth request to the lock manger on behalf of an application part being processed on a CPU coupled to the object library, when the respective application part is to receive a message, the sixth request being for a conversion of the preselected access privilege to the BROADCAST resource to a NULL access privilege so that the fourth request of the calling routine is granted.

28. The object library of claim 27, wherein the MSG_AST subroutine further includes instructions to read the message stored by the lock manager on behalf of the calling routine.

29. The object library of claim 28, wherein the calling routine is the SETUP subroutine.

30. The object library of claim 29, wherein the SETUP subroutine calls the CLSUTER_BROADCAST subroutine to send a message on behalf of a respective calling application part to an application part granted the first request, the message indicating that the respective calling application part is being processed on a CPU.

31. The object library of claim 30, wherein the MSG_AST subroutine further includes instructions to verify, upon reading a message indicating that a respective calling application part is being processed, that its respective application part was granted a first request and when its respective application has been granted a first request, to verify that a third request was made in respect of the calling application part.

32. The object library of claim 28, wherein the calling routine is the SPECIAL_AST subroutine.

33. The object library of claim 32, wherein the SPECIAL_AST subroutine calls the CLUSTER_BROADCAST subroutine upon the grant of a first request on behalf of a respective application part, to send a message on behalf of the respective application part to all other application parts, the message indicating that the respective application part has been granted a first request.

34. The object library of claim 33 further comprising a memory space associated with each CPU processing an application part, for storage of information on an application part that has sent a message indicating that it has been granted a first request.

35. The object library of claim 28 further comprising:
a first looping routine in the MSG_AST subroutine including an instruction loop to periodically query the lock manager for information on the granting of a fourth request made on behalf of a calling routine by the CLUSTER_BROADCAST subroutine until the information indicates that the fourth request has been granted;

the MSG_AST subroutine including further instructions subsequent to the first looping routine to issue a seventh request to the lock manager, upon the first looping routine, receiving information on the grant of the fourth request, for conversion of the NULL access privilege back to the preselected access privilege to the BROADCAST resource.

36. The object library of claim 35, wherein:

the CLUSTER_BROADCAST subroutine includes further instructions to issue an eighth request to the lock manager to release the exclusive access privilege on the BROADCAST resource after the CLUSTER_BROADCAST subroutine writes a message, and further comprising:

a second looping routine in the CLUSTER_BROADCAST subroutine including an instruction loop to periodically query the lock manager, after release of the exclusive access privilege on the BROADCAST resource, for information on all existing NULL access privileges to the BROADCAST resource;

the CLUSTER_BROADCAST subroutine returning control to the calling routine when the information on all existing NULL access privileges indicates that there is no NULL access privilege for the BROADCAST resource;

so that the first and second looping routines synchronize and coordinate the running of the CLUSTER_BROADCAST subroutine and the MSG_AST subroutine to transmit messages from a calling routine to application parts.

37. The object library of claim 34, wherein the SPECIAL_AST subroutine further includes instructions to access the memory space associated with the CPU processing the calling application part to read the information on an application part granted a first request to verify that the calling application part is a first application part granted a first request.

38. The object library of claim 37, wherein the SPECIAL_AST subroutine further includes instructions causing a message to be generated, when the calling application part was not the first application part identified in the information stored in the memory space; the message indicating that the node processing the first application part has failed.

39. The object library of claim 25, wherein the CLUSTER_BROADCAST subroutine issues the fourth request for an exclusive access privilege to the BROADCAST resource by making a request to the lock manager for an exclusive access privilege to a PERMISSION_TO_TALK resource and, upon the grant of the exclusive access privilege to the PERMISSION_TO_TALK resource, issuing the fourth request.

40. The object library of claim 24, wherein the FAIL_AST subroutine further includes instructions to cause a message to be generated to identify the name of the resource based upon the application part for which the third request has been granted.

41. The object library of claim 24, wherein the FAIL_AST subroutine further includes instructions to call a failure recovery routine and to provide the information to the failure recovery routine.

42. The object library of claim 24, wherein the lock manager maintains a data block for each resource name; and further comprising:

an UPDATE_INFO subroutine comprising a sequence of instructions to access a data block of a preselected resource name for input and storage of information in the data block.

43. The object library of claim 42, further comprising:

a SHOW_SERVER subroutine comprising a sequence of instructions to read information stored in the data block of a preselected resource name.

44. The object library of claim 24 further comprising:

a LIST_SERVER subroutine comprising a sequence of instructions to query the lock manager for information on requests for access privileges to resource names.

45. A computer network, comprising:

a plurality of nodes, wherein at least certain ones of the plurality of nodes have a CPU and wherein a predetermined number of the CPUs are each processing one part of an application program;

a lock manager to receive and process requests for access privileges to resource names and to provide information on the requests in response to a query; and a failure notification system comprising an object library coupled to each one of the CPUs processing one part of the application program, each object library comprising a linked set of subroutines including:

i) a SETUP subroutine that can be called by an application part being processed on a respective CPU coupled to the object library, the SETUP subroutine comprising a sequence of instructions to issue a first request to the lock manager on behalf of the calling application part for an exclusive access privilege to a preselected resource name and to issue a second request to the lock manager on behalf of the calling application part for a preselected access privilege to a resource name based upon the calling application part;

ii) a SPECIAL_AST subroutine that is an asynchronous system trap called upon grant of the first request to the calling application part, the SPECIAL_AST subroutine comprising a sequence of instructions to query the lock manager for a list of all application parts of the application program that have made a first request through a SETUP subroutine and that have not been granted the first request and to issue a third request to the lock manager on behalf of the calling application part that has been granted the first request for an access privilege to each resource name based upon an application part that has not been granted the first request, each third request being for an access privilege that is not compatible with the predetermined access privilege of a second request; and iii) a FAIL_AST subroutine that is an asynchronous system trap called upon the grant of any third request to the calling application part that has been granted the first request, the FAIL_AST subroutine comprising a sequence of instructions to query the lock manager for information on the name of the resource based upon the application part for which the third request has been granted.

46. A method for providing failure notification in a computer network having a plurality of nodes wherein a predetermined number of the nodes are each processing one part of an application program, which method comprises the steps of:

providing a lock manager to receive and process requests for access privileges to resource names and to provide information on the requests in response to a query;

executing a first routine in respect of each part of the application program to issue a first request to the lock manager on behalf of each application part for an exclusive access privilege to a preselected resource name and to issue a second request to the lock manager on behalf of each application part for a preselected access privilege to a resource name based upon a respective application part;

operating the lock manager to grant the first request for an exclusive access privilege to one and only one of the application parts and to grant the second request to each respective application part;

executing a second routine in respect of the application part granted the first request, upon the grant of the first request, to query the lock manager for a list of all application parts of the application program that have made a first request through a first routine and that have not been granted the first request and to issue a third request to the lock manager on behalf of the application part that has been ranted the first request for an access privilege to each resource name based upon an application part that has not been granted the first request, each third request being for an access privilege that is not compatible with the predetermined access privilege of a second request;

operating the lock manager to store information on each third request that is not compatible with a granted second request of each respective application part that has not been granted the first request;

operating the lock manager to invalidate a second request when the node processing the respective application part fails and to automatically grant the third request made by the second routine in respect of the resource name based upon that respective application part; and upon the grant of a third request by the lock manager, executing a third routine in respect of the application part granted the first request to query the lock manager for information on the name of the resource based upon the respective application part for which the third request has been granted.

47. The method of claim 46 further comprising the step of operating the lock manager to invalidate the granted first request when the node processing the application part that was granted the first request fails and to grant the first request to another part of the application program that previously made a first request through the execution of a first routine.

48. The method of claim 47, wherein, upon the grant of the first request to the another application part, executing the second routine in respect of the another application part.

49. The method of claim 46, comprising the further step of executing the third routine to cause a message to be generated, the message containing the information provided by the lock manager in response to the query.

50. The method of claim 46, comprising the further step of executing the third routine to call a failure recovery routine and to provide the information to the failure recovery routine.

51. The method of claim 46 comprising the further step of, upon the grant of a first request in respect of one application part, broadcasting a message to each other application part to identify the application part that was granted the first request.

52. The method of claim 51 comprising the further step of storing the message in a memory space provided for each application part.

53. The method of claim 46 comprising the further steps of:

for each application part that was not granted the first request, sending a message to the application part that was granted the first request to identify each respective application, and for the application part that was granted the first request, reading each message of the previous step and verifying that a third request was made in respect of each application part that sent a message.

54. In a computer network including a plurality of nodes, wherein a predetermined number of the nodes are each processing one part of an application program, a communication system for sending and receiving messages to and from the parts of the application program, which communication system comprises:

a lock manager to receive and process requests for access privileges to resource names; and an object library coupled to each node processing one part of the application program and comprising a set of subroutines including:

i) a SETUP subroutine called by an application part and comprising a sequence of instructions to issue a first request to the lock manager on behalf of the respective calling application part for a preselected access privilege to a BROADCAST resource, the preselected access privilege being compatible with multiple first requests made on behalf of other application parts;

i) a CLUSTER_BROADCAST subroutine called by another routine and comprising a sequence of instructions to issue a second request to the lock manager on behalf of the calling routine for an exclusive access privilege to the BROADCAST resource and, upon grant of the second request, to write a message on behalf of the calling routine to the lock manager for storage; and ii) an MSG_AST subroutine that is a asynchronous system trap called upon the making of a second request on behalf of a calling routine, the second request for an exclusive access privilege being incompatible with the preselected access privilege of the first request, the MSG_AST subroutine comprising a sequence of instructions to issue a third request to the lock manager on behalf of a respective application part, the third request being for a conversion of the preselected access privilege to the BROADCAST resource to a NULL access privilege so that the second request of the calling routine is granted and thereafter, to read the message stored by the lock manager on behalf of the calling routine.

55. The communication system of claim 54, wherein the CLUSTER_BROADCAST subroutine issues the second request for an exclusive access privilege to the BROADCAST resource by making a request to the lock manager for an exclusive access privilege to a PERMISSION_TO_TALK resource and, upon the grant of the exclusive access privilege to the PERMISSION_TO_TALK resource, issuing the second request.

56. The communication system of claim 54 further comprising:

a first looping routine in the MSG_AST subroutine including an instruction loop to periodically query the lock manager for information on the granting of a second request made on behalf of a calling routine by the CLUSTER_BROADCAST subroutine until the information indicates that the second request has been granted;

the MSG_AST subroutine including further instructions subsequent to the first looping routine to issue a fourth request to the lock manager, upon the first looping routine receiving information on the grant of the second request, for conversion of the NULL access privilege back to the preselected access privilege to the BROADCAST resource.

57. The communication system of claim 56, wherein:

the CLUSTER_BROADCAST subroutine includes further instructions to issue an fifth request to the lock manager to release the exclusive access privilege on the BROADCAST resource after the CLUSTER_BROADCAST subroutine writes a message, and further comprising:

a second looping routine in the CLUSTER_BROADCAST subroutine including an instruction loop to periodically query the lock manager, after release of the exclusive access privilege on the BROADCAST resource, for information on all existing NULL access privileges to the BROADCAST resource;

the CLUSTER_BROADCAST subroutine returning control to the calling routine when the information on all existing NULL access privileges indicates that there is no NULL access privilege for the BROADCAST resource;

so that the first and second looping routines synchronize and coordinate the running of the CLUSTER_BROADCAST subroutine and the MSG_AST subroutine to transmit messages from a calling routine to application parts.

* * * * *